(12) United States Patent
Bönsch et al.

(10) Patent No.: US 11,273,617 B2
(45) Date of Patent: Mar. 15, 2022

(54) SHEETLIKE COMPOSITE, IN PARTICULAR FOR THE PRODUCTION OF DIMENSIONALLY STABLE FOODSTUFF CONTAINERS, HAVING A FIRST BENDING RESISTANCE WHICH IS LESS THAN A FURTHER BENDING RESISTANCE

(71) Applicant: SIG TECHNOLOGY AG, Neuhausen am Rheinfall (CH)

(72) Inventors: Karen Bönsch, Langerwehe (DE); Heinrich Schollenberger, Jülich (DE)

(73) Assignee: SIG TECHNOLOGY AG, Neuhausen am Rheinfall (CH)

( * ) Notice: Subject to any disclaimer, the term of this patent is extended or adjusted under 35 U.S.C. 154(b) by 213 days.

(21) Appl. No.: 16/342,760

(22) PCT Filed: Oct. 16, 2017

(86) PCT No.: PCT/EP2017/076370
§ 371 (c)(1),
(2) Date: Apr. 17, 2019

(87) PCT Pub. No.: WO2018/073184
PCT Pub. Date: Apr. 26, 2018

(65) Prior Publication Data
US 2019/0270270 A1    Sep. 5, 2019

(30) Foreign Application Priority Data

Oct. 17, 2016 (EP) ..................................... 16194222
Nov. 15, 2016 (CN) .......................... 201611004741.2
Nov. 15, 2016 (CN) .......................... 201621226979.5

(51) Int. Cl.
*B32B 1/02* (2006.01)
*B32B 27/10* (2006.01)
(Continued)

(52) U.S. Cl.
CPC ................ *B32B 3/02* (2013.01); *B31B 50/26* (2017.08); *B32B 1/00* (2013.01); *B32B 1/02* (2013.01);
(Continued)

(58) Field of Classification Search
CPC .. B32B 1/02; B32B 3/02; B32B 15/12; B32B 27/10; B32B 29/002; B32B 2250/03;
(Continued)

(56) References Cited

U.S. PATENT DOCUMENTS 6,071,576 A * 6/2000 Bentmar ................. B32B 27/10
428/34.2
2007/0286972 A1 12/2007 Kjelgaard et al.

FOREIGN PATENT DOCUMENTS

CN          103042798 A       4/2013
CN          104309259 A       1/2015
(Continued)

OTHER PUBLICATIONS

Nagasawa et al., "Creasing characteristic of aluminum foil coated paperboard," Journal of Material Processing Technology, vol. 201, 2008, pp. 401-407.
(Continued)

*Primary Examiner* — Walter Aughenbaugh
(74) *Attorney, Agent, or Firm* — Meunier Carlin & Curfman LLC

(57) ABSTRACT

The present invention refers to a sheetlike composite, comprising as a layer sequence in a direction from an outer surface of the sheetlike composite to an inner surface of the sheetlike composite a) an outer polymer layer, b) a colour application, c) a carrier layer, and d) a barrier layer; wherein the sheetlike composite comprises at least one longitudinal crease line; wherein the at least one longitudinal crease line is oriented in a first direction; wherein the sheetlike com-
(Continued)

posite has a first bending resistance in the first direction; wherein a further direction is perpendicular to the first direction; wherein the sheetlike composite has a further bending resistance in the further direction; wherein the first bending resistance is less than the further bending resistance. The invention further refers to a container precursor and to a closed container, in each case comprising the preceding sheetlike composite; and to a container precursor and a closed container, in each case having a sheetlike composite with a first bending resistance along a first direction which is less than a further bending resistance along a further direction.

12 Claims, 6 Drawing Sheets

(51) Int. Cl.
| | |
|---|---|
| B32B 3/02 | (2006.01) |
| B31B 50/26 | (2017.01) |
| B32B 3/26 | (2006.01) |
| B32B 5/14 | (2006.01) |
| B32B 15/085 | (2006.01) |
| B32B 15/12 | (2006.01) |
| B32B 15/20 | (2006.01) |
| B32B 27/08 | (2006.01) |
| B32B 29/00 | (2006.01) |
| B65H 45/22 | (2006.01) |
| B65D 5/00 | (2006.01) |
| B32B 15/04 | (2006.01) |
| B32B 27/32 | (2006.01) |
| B32B 1/00 | (2006.01) |
| B32B 3/00 | (2006.01) |
| B65D 5/42 | (2006.01) |
| B32B 7/12 | (2006.01) |
| B32B 27/30 | (2006.01) |
| B32B 27/34 | (2006.01) |
| B32B 27/36 | (2006.01) |
| B32B 15/08 | (2006.01) |

(52) U.S. Cl.
CPC ............... *B32B 3/00* (2013.01); *B32B 3/266* (2013.01); *B32B 5/142* (2013.01); *B32B 15/04* (2013.01); *B32B 15/085* (2013.01); *B32B 15/12* (2013.01); *B32B 15/20* (2013.01); *B32B 27/08* (2013.01); *B32B 27/10* (2013.01); *B32B 27/32* (2013.01); *B32B 29/002* (2013.01); *B65D 5/00* (2013.01); *B65D 5/4266* (2013.01); *B65H 45/22* (2013.01); *B32B 7/12* (2013.01); *B32B 15/08* (2013.01); *B32B 27/306* (2013.01); *B32B 27/308* (2013.01); *B32B 27/325* (2013.01); *B32B 27/327* (2013.01); *B32B 27/34* (2013.01); *B32B 27/36* (2013.01); *B32B 2250/03* (2013.01); *B32B 2250/05* (2013.01); *B32B 2262/02* (2013.01); *B32B 2262/062* (2013.01); *B32B 2262/067* (2013.01); *B32B 2270/00* (2013.01); *B32B 2307/4023* (2013.01); *B32B 2307/4026* (2013.01); *B32B 2307/546* (2013.01); *B32B 2307/558* (2013.01); *B32B 2307/718* (2013.01); *B32B 2307/7242* (2013.01); *B32B 2307/7265* (2013.01); *B32B 2307/734* (2013.01); *B32B 2307/75* (2013.01); *B32B 2439/62* (2013.01); *B32B 2439/70* (2013.01); *Y10T 428/1303* (2015.01); *Y10T 428/1352* (2015.01); *Y10T 428/1379* (2015.01)

(58) Field of Classification Search
CPC .......... B32B 2262/062; B32B 2270/00; B32B 2307/4023; B32B 2307/4026; B32B 2307/546; B32B 2307/734; B32B 2439/62; B65D 5/4266; Y10T 428/1303; Y10T 428/1352; Y10T 428/1379
See application file for complete search history.

(56) References Cited

FOREIGN PATENT DOCUMENTS

| | | | |
|---|---|---|---|
| EP | 3015385 | A1 | 5/2016 |
| JP | 2008519736 | A | 6/2008 |
| WO | 9429103 | A1 | 12/1994 |
| WO | 2011091987 | A1 | 8/2011 |
| WO | 2015028066 | A1 | 3/2015 |

OTHER PUBLICATIONS

PCT/EP17/76370, International Search Report and Written Opinion dated Feb. 12, 2018.
Office Action in connection to Chinese Application No. 20161100474.2, dated Sep. 24, 2020.
Takeo Co, Ltd., Sep. 5, 2010, pp. 1 to 3, http://web.archive.org/web/20100905125557/https://takeopaper.com/about_paper/line/index.html there is some English translation on pp. 4-5 of 6-p. document; date of publication of document / access date not clear and/or could not be located, date of translation / Access date translation not clear and/or could not be located-WA.
Office Action issued for Japanese Application No. 2019-520545, dated Sep. 28, 2021.

* cited by examiner

100

100

300

400

500

600

SHEETLIKE COMPOSITE, IN PARTICULAR FOR THE PRODUCTION OF DIMENSIONALLY STABLE FOODSTUFF CONTAINERS, HAVING A FIRST BENDING RESISTANCE WHICH IS LESS THAN A FURTHER BENDING RESISTANCE

The present invention refers to a sheetlike composite, comprising as a layer sequence in a direction from an outer surface of the sheetlike composite to an inner surface of the sheetlike composite
a) an outer polymer layer,
b) a colour application,
c) a carrier layer, and
d) a barrier layer;
wherein the sheetlike composite comprises at least one longitudinal crease line; wherein the at least one longitudinal crease line is oriented in a first direction; wherein the sheetlike composite has a first bending resistance in the first direction; wherein a further direction is perpendicular to the first direction; wherein the sheetlike composite has a further bending resistance in the further direction; wherein the first bending resistance is less than the further bending resistance. The invention further refers to a container precursor and to a closed container, in each case comprising the preceding sheetlike composite; and to a container precursor and a closed container, in each case having a sheetlike composite with a first bending resistance along a first direction which is less than a further bending resistance along a further direction.

For some time, foodstuffs have been preserved, whether they be foodstuffs for human consumption or else animal feed products, by storing them either in a can or in a jar closed by a lid. In this case, shelf life can be increased firstly by separately and very substantially sterilising the foodstuff and the container in each case, here the jar or can, and then introducing the foodstuff into the container and closing the container. However, these measures of increasing the shelf life of foodstuffs, which have been tried and tested over a long period, have a series of disadvantages, for example the need for another sterilisation later on. Cans and jars, because of their essentially cylindrical shape, have the disadvantage that very dense and space-saving storage is not possible. Moreover, cans and jars have considerable intrinsic weight, which leads to increased energy expenditure in transport. Moreover, production of glass, tinplate or aluminium, even when the raw materials used for the purpose are recycled, necessitates quite a high expenditure of energy. In the case of jars, an aggravating factor is elevated expenditure on transport. The jars are usually prefabricated in a glass factory and then have to be transported to the facility where the foodstuff is dispensed with utilisation of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a repeated occurrence that broken glass gets into the foodstuff in the course of filling or opening of the filled jars, which can lead in the worst case to internal injuries on consumption of the foodstuff. In addition, both cans and jars have to be labelled for identification and promotion of the foodstuff contents. The jars and cans cannot be printed directly with information and promotional messages. In addition to the actual printing, a substrate is thus needed for the purpose, a paper or suitable film, as is a securing means, an adhesive or sealant.

Other packaging systems are known from the prior art, in order to store foodstuffs over a long period with minimum impairment. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. As the carrier layer imparts rigidity and dimensional stability to the container produced from the laminate, these laminate containers are to be seen in a line of development with the above mentioned glasses and jars. In this the above mentioned laminate containers differ severely from pouches and bags produced from thin foils without carrier layer.

The laminate containers of the prior art already have many advantages over the conventional jars and cans. For example, a decoration or print image can be printed directly onto the laminate or laminate precursor without the need for a separate substrate. Such a decoration may comprise information about ingredients of the foodstuff to be stored in the laminate container and/or provide a visually appealing appearance to the consumer. Nevertheless, there are improvement opportunities even in the case of these packaging systems. For example, there are needs for laminates for the production of dimensionally stable foodstuff containers, wherein the laminates are suitable for an improved production.

In general terms, it is an object of the present invention to at least partly overcome at least one disadvantage which arises from the prior art. It is a further object of the invention to provide a laminate for the production of dimensionally stable foodstuff containers, wherein the laminate can be obtained by an improved process. Therein, an improvement of the laminate production process may refer to a step of printing a decoration onto a laminate precursor. However, improvements in other steps of the laminate production are desired as well. It is a further object of the invention to provide a laminate for the production of dimensionally stable foodstuff containers, wherein the laminate or a precursor of this laminate shows an improved processability. It is a further object of the invention to provide a container precursor and a container, made from any of the preceding advantageous laminates. It is a further object of the invention to provide a dimensionally stable laminate-container for foodstuffs which shows an improved visual appearance. It is a further object of the invention to provide a dimensionally stable laminate-container for foodstuffs which are obtainable from a laminate by an improved process. Therein, by the improved process preferably less substandard is obtained.

Further, it is an object of the present invention to provide a laminate for the production of dimensionally stable foodstuff containers which for a fixed container format can be stored and transported in an as space saving as possible manner, whereby a decoration of these containers is as little prone to being damaged along longitudinal edges of the container as possible. It is a further object of the invention that the aforementioned laminate further allows for as many as possible of the aforementioned containers having a given container format and content to be transported without exceeding a given transport weight.

A contribution to at least partial achievement of at least one of the above objects is made by the independent claims.

The dependent claims provide preferred embodiments which contribute to at least partial achievement of at least one of the objects.

A contribution to the achievement of at least one of the objects of the invention is made by an embodiment 1 of a sheetlike composite, comprising as a layer sequence in a direction from an outer surface of the sheetlike composite to an inner surface of the sheetlike composite a) an outer polymer layer,
b) a colour application,
c) a carrier layer, and
d) a barrier layer;

wherein the sheetlike composite comprises at least one, preferably at least two, more preferably at least three, most preferably at least four, longitudinal crease line(s); wherein the longitudinal crease line(s) is/are oriented in a first direction; wherein the sheetlike composite has a first bending resistance in the first direction; wherein a further direction is perpendicular to the first direction; wherein the sheetlike composite has a further bending resistance in the further direction; wherein the first bending resistance is less than the further bending resistance. Preferably, the first bending resistance is less than the further bending resistance by at least 10 mN·m, more preferably at least 20 mN·m, more preferably at least 30 mN·m, more preferably at least 40 mN·m, more preferably at least 50 mN·m, more preferably at least 60 mN·m, more preferably at least 70 mN·m, more preferably at least 80 mN·m, more preferably at least 90 mN·m, more preferably at least 100 mN·m, most preferably at least 150 mN·m. The first bending resistance is preferably in the range from 50 to 750 mN·m, more preferably from 100 to 700 mN·m. The further bending resistance is preferably in the range from 50 to 800 mN·m, more preferably from 50 to 750 mN·m. In a further embodiment, the further bending resistance is preferably in the range from 60 to 800 mN·m, more preferably from 70 to 800 mN·m, more preferably from 80 to 800 mN·m, more preferably from 90 to 800 mN·m, more preferably from 100 to 800 mN·m, most preferably from 100 to 750 mN·m. In the further direction, the carrier layer preferably has a bending resistance in the range from 70 to 700 mN·m, more preferably from 80 to 650 mN·m. In the first direction the carrier layer preferably has bending resistance in the range from 10 to 350 mN·m, more preferably from 20 to 300 mN·m.

Preferably, the sheetlike composite extends sheetlike in a plane, wherein the first direction and the further direction are both in the plane. Preferably, the first direction and the further direction are both perpendicular to a thickness of the sheetlike composite. A preferred sheetlike composite is a pre-cut for the production of a single container.

In an embodiment 2 according to the invention, the sheetlike composite is configured according to the embodiment 1, wherein a ratio of the first bending resistance to the further bending resistance is in the range from 1:10 to 1:1.5, more preferably from 1:9 to 1:1.5, more preferably from 1:8 to 1:1.5, more preferably from 1:7 to 1:1.5, more preferably from 1:6 to 1:1.5, more preferably from 1:5 to 1:1.5, most preferably from 1:5 to 1:2.

In an embodiment 3 according to the invention, the sheetlike composite is configured according to the embodiment 1 or 2, wherein the carrier layer comprises a plurality of fibres, wherein at least 55%, preferably at least 60%, more preferably at least 70%, most preferably at least 80%, of the fibres of the plurality of fibres incline an angle of less than 30°, preferably less than 25°, more preferably less than 20°, more preferably less than 15°, most preferably less than 10, with the further direction. Therein, no correlation between the preferred values for the fraction of the fibres of the plurality fulfilling the preceding criterion and for the angles of inclination is implied. Hence, any percentage according to the embodiment 3 may be combined with any angle disclosed in the context of the embodiment 3, thereby obtaining a preferred item according to the invention. Consequently, as an example also at least 80% of the fibres of the plurality of fibres inclining an angle of less than 30° with the further direction is a preferred combination.

Preferably, the carrier layer comprises a plurality of fibres. Therein, the fibres are preferably one selected from the group consisting of primary fibres obtained from wood, secondary fibres obtained from paper, textile fibres, and synthetic fibres, or a combination of at least two thereof. Further preferably, the carrier layer, comprising a plurality of fibres, is characterised by a running direction, also known as fibre run. Therein, the running direction is a direction in which a primary material, comprising the fibres, was predominantly moved in the production of the carrier layer. Preferably, the running direction and the further direction incline an angle of less than 30°, preferably less than 25°, more preferably less than 20°, more preferably less than 15°, most preferably less than 10. A preferred primary material is pulp.

In an embodiment 4 according to the invention, the sheetlike composite is configured according to any of the embodiments 1 to 3, wherein the outer polymer layer is an outermost layer of the sheetlike composite. Preferably, no layer of the sheetlike composite superimposes the outer polymer layer on a side of the outer polymer layer which faces away from the carrier layer.

In an embodiment 5 according to the invention, the sheetlike composite is configured according to any of the embodiments 1 to 4, wherein the colour application adjoins the carrier layer. Hence, according to this preferred embodiment, there is no layer present between the colour application and the carrier layer.

In an embodiment 6 according to the invention, the sheetlike composite is configured according to any of the embodiments 1 to 5, wherein the carrier layer includes, preferably consists of, one selected from the group consisting of paperboard, cardboard, and paper, or a combination of at least two thereof. The terms "paper", "paperboard" and "cardboard" are used herein in accordance with the definitions in the standard DIN 6735:2010. In addition, cardboard is preferably a material which shows a mixture of features of paper and paperboard. Further, cardboard preferably has a grammage in the range from 150 to 600 g/m$^2$.

In an embodiment 7 according to the invention, the sheetlike composite is configured according to any of the embodiments 1 to 6, wherein the colour application comprises at least 4 wt.-%, preferably at least 6 wt.-%, more preferably at least 8 wt.-%, in each case of at least one colourant, based on the weight of the colour application.

In an embodiment 8 according to the invention, the sheetlike composite is configured according to any of the embodiments 1 to 7, wherein the outer polymer layer comprises at least 50 wt.-%, preferably at least 75 wt.-%, more preferably at least 80 wt.-%, of a polyethylene, in each case based on the weight of the outer polymer layer.

In an embodiment 9 according to the invention, the sheetlike composite is configured according to any of the embodiments 1 to 8, wherein the colour application comprises at least 10 wt.-%, preferably at least 15 wt.-%, more preferably at least 20 wt.-%, of a styrene copolymer, in each case based on the weight of the colour application. A preferred styrene copolymer is a styrene acrylate copolymer.

In an embodiment 10 according to the invention, the sheetlike composite is configured according to any of the embodiments 1 to 8, wherein the colour application comprises at least 5 wt.-%, preferably at least 10 wt.-%, more preferably at least 15 wt.-%, of a polyvinyl butyral, in each case based on the weight of the colour application.

In an embodiment 11 according to the invention, the sheetlike composite is configured according to any of the embodiments 1 to 8, wherein the colour application comprises at least 10 wt.-%, preferably at least 15 wt.-%, more preferably at least 20 wt.-%, of nitrocellulose, in each case based on the weight of the colour application.

A contribution to the achievement of at least one of the objects of the invention is made by an embodiment 1 of a container precursor 1, comprising the sheetlike composite according to any of its embodiments 1 to 11.

In an embodiment 2 according to the invention, the container precursor 1 is configured according to its embodiment 1, wherein the sheetlike composite comprises at least one, preferably at least two, more preferably at least three, most preferably at least four, longitudinal fold(s), each being oriented in the first direction.

A contribution to the achievement of at least one of the objects of the invention is made by an embodiment 1 of a container precursor 2, comprising a sheetlike composite; wherein the sheetlike composite comprises as a layer sequence in a direction from an outer surface of the sheetlike composite to an inner surface of the sheetlike composite
  a) an outer polymer layer,
  b) a colour application,
  c) a carrier layer, and
  d) a barrier layer;
wherein the sheetlike composite has been folded, thereby forming at least one, preferably at least two, more preferably at least three, most preferably at least four, longitudinal fold(s) of the container precursor; wherein the longitudinal fold(s) is/are oriented in a first direction; wherein the sheetlike composite has a first bending resistance in the first direction; wherein a further direction is perpendicular to the first direction; wherein the sheetlike composite has a further bending resistance in the further direction; wherein the first bending resistance is less than the further bending resistance. Preferably, the first bending resistance is less than the further bending resistance by at least 10 mN·m, more preferably at least 20 mN·m, more preferably at least 30 mN·m, more preferably at least 40 mN·m, more preferably at least 50 mN·m, more preferably at least 60 mN·m, more preferably at least 70 mN·m, more preferably at least 80 mN·m, more preferably at least 90 mN·m, more preferably at least 100 mN·m, most preferably at least 150 mN·m. The first bending resistance is preferably in the range from 50 to 750 mN·m, more preferably from 100 to 700 mN·m. The further bending resistance is preferably in the range from 50 to 800 mN·m, more preferably from 50 to 750 mN·m. In a further embodiment, the further bending resistance is preferably in the range from 60 to 800 mN·m, more preferably from 70 to 800 mN·m, more preferably from 80 to 800 mN·m, more preferably from 90 to 800 mN·m, more preferably from 100 to 800 mN·m, most preferably from 100 to 750 mN·m. In the further direction, the carrier layer preferably has a bending resistance in the range from 70 to 700 mN·m, more preferably from 80 to 650 mN·m. In the first direction the carrier layer preferably has bending resistance in the range from 10 to 350 mN·m, more preferably from 20 to 300 mN·m.

In a further embodiment according to the invention, the container precursor 1 or the container precursor 2 is configured according to one of its preceding embodiments, wherein the sheetlike composite comprises a first longitudinal rim and a further longitudinal rim, wherein the first longitudinal rim is joined to the further longitudinal rim, forming a longitudinal seam of the container precursor. Preferably, the longitudinal seam is oriented in the first direction.

A contribution to the achievement of at least one of the objects of the invention is made by an embodiment 1 of a closed container 1, comprising the sheetlike composite according to any of its embodiments 1 to 11.

A contribution to the achievement of at least one of the objects of the invention is made by an embodiment 1 of a closed container 2, surrounding an interior; wherein the closed container comprises a sheetlike composite; wherein the sheetlike composite comprises as a layer sequence in a direction from an exterior of the closed container to the interior
  a) an outer polymer layer,
  b) a colour application,
  c) a carrier layer, and
  d) a barrier layer;
wherein the closed container has at least one, preferably at least two, more preferably at least three, most preferably at least four, longitudinal edge(s); wherein the longitudinal edge(s) is/are oriented in a first direction; wherein the sheetlike composite has a first bending resistance in the first direction; wherein a further direction is perpendicular to the first direction; wherein the sheetlike composite has a further bending resistance in the further direction; wherein the first bending resistance is less than the further bending resistance. Preferably, the first bending resistance is less than the further bending resistance by at least 10 mN·m, more preferably at least 20 mN·m, more preferably at least 30 mN·m, more preferably at least 40 mN·m, more preferably at least 50 mN·m, more preferably at least 60 mN·m, more preferably at least 70 mN·m, more preferably at least 80 mN·m, more preferably at least 90 mN·m, more preferably at least 100 mN·m, most preferably at least 150 mN·m. The first bending resistance is preferably in the range from 50 to 750 mN·m, more preferably from 100 to 700 mN·m. The further bending resistance is preferably in the range from 50 to 800 mN·m, more preferably from 50 to 750 mN·m. In a further embodiment, the further bending resistance is preferably in the range from 60 to 800 mN·m, more preferably from 70 to 800 mN·m, more preferably from 80 to 800 mN·m, more preferably from 90 to 800 mN·m, more preferably from 100 to 800 mN·m, most preferably from 100 to 750 mN·m. In the further direction, the carrier layer preferably has a bending resistance in the range from 70 to 700 mN·m, more preferably from 80 to 650 mN·m. In the first direction the carrier layer preferably has bending resistance in the range from 10 to 350 mN·m, more preferably from 20 to 300 mN·m.

In an embodiment 2 according to the invention, the closed container 1 or 2 is configured according to its embodiment 1 respectively, wherein the closed container comprises a foodstuff.

Features which are described to be preferred in the context of a category of the invention, in particular according to the sheetlike composite, are as well preferred in further embodiments of the further categories of the invention.

Longitudinal Crease Lines, Longitudinal Folds, Longitudinal Edges

A longitudinal crease line is a crease line which is oriented in a longitudinal direction. Therein, the longitudinal direction is perpendicular to a transverse direction. Preferably, the first direction is the longitudinal direction. Further preferably, the further direction is the transverse direction. For a closed container standing upright on its base, the longitudinal direction is preferably vertical. Hence, for this closed container standing upright on its base the transverse direction is preferably horizontal. Further, the longitudinal direction is preferably a direction of a height of a container precursor or closed container to be produced from the sheetlike composite according to the invention. Further preferably, the transverse direction is a direction of a circumference of a jacket surface of the container precursor or the closed container. This holds in particular if the closed container is of a cuboid shape.

A sheetlike composite according to the invention preferably comprises a first transversal rim and a further transversal rim, wherein the first transversal rim is positioned at an opposite end across the outer surface or the inner surface or both of the sheetlike composite with respect to the further transversal rim. Further, the sheetlike composite preferably comprises a first longitudinal rim and a further longitudinal rim, wherein the first longitudinal rim is positioned at an opposite end across the outer surface or the inner surface or both of the sheetlike composite with respect to the further longitudinal rim. In a sheetlike composite having a rectangular outer surface or inner surface or both, the first and the further longitudinal rims are perpendicular to the first and the further transversal rims. In a preferred container precursor, comprising the sheetlike composite the first and the further longitudinal rims are joined to one another, thereby forming a longitudinal seam. The longitudinal crease line preferably extends between the first and the further transversal rims. More preferably, the longitudinal crease lines connect the first and the further longitudinal rim with each other across the outer surface or the inner surface or both of the sheetlike composite. The first transversal rim of the sheetlike composite is preferably configured to at least partly form a top region of the container precursor or the closed container to be produced from the sheetlike composite. The further transversal rim of the sheetlike composite is preferably configured to at least partly form a bottom or base region of the container precursor or the closed container to be produced from the sheetlike composite.

By folding along the longitudinal crease line a longitudinal fold is obtainable. In a preferred container precursor according to the invention, the longitudinal fold extends from a top to a bottom region of the container precursor. The container precursor is preferably open in both the top and the bottom region. Preferably, the longitudinal fold is oriented in parallel to the longitudinal seam of the container precursor. A length of the longitudinal fold of the container precursor is preferably equal to a height of this container precursor. This holds in particular if the container precursor is designed for the production of a closed container of cuboid shape. Further, a length of the longitudinal fold of the container precursor is preferably equal to a height of the container precursor. Preferably, a section of the longitudinal fold of the container precursor forms a longitudinal edge of the closed container obtainable from the container precursor. Further sections of the longitudinal fold are processed in the top and bottom regions of the closed container respectively in the production of the closed container from the container precursor. A length of the longitudinal edge is preferably equal to a height of the closed container. This holds in particular for a closed container of cuboid shape. However, containers of other shapes are feasible in accordance with the invention as well. For example, the closed container may comprise a gable-shaped top region, which contributes to the height of the container, but the longitudinal fold does not extend into this top region. Preferably, a closed container according to the invention comprises a jacket surface of wall segments. In a cuboid container these wall segments are 4 rectangular segments. Preferably, at a longitudinal edge of the container, two neighbouring wall segments of the jacket surface meet each other.

In a preferred sheetlike composite according to the invention, the carrier layer has a transverse fibre. The term transverse fibre is known to the person skilled in the art of paper-, cardboard- or paperboard-making as the opposite of a longitudinal fibre. Further, in a preferred container precursor according to the invention, the carrier layer has a transverse fibre. Further, in a preferred closed container according to the invention, the carrier layer has a transverse fibre.

Colour Application

Generally, a colour application is a solid material on a surface, wherein the solid material comprises at least one colourant. Therein, the colour application may be continuous or discontinuous. If the colour application is discontinuous, it preferably has a surface coverage of less than 100%. According to DIN 55943:2001-10, colourant is the collective term for all colouring substances, especially for dyes and pigments. A preferred colourant is a pigment. A preferred pigment is an inorganic pigment or an organic pigment or both, wherein the organic pigment is particularly preferred. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9). However, other pigments may be considered as well. For example, the following are further notable suitable pigments:

i. red or magenta pigments: pigment red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, pigment violet 3, 19, 23, 29, 30, 37, 50 and 88;

ii. blue or cyan pigments: pigment blue 1, 15, 15:1, 15:2, 15:3, 15:4, 15:6, 16, 17-1, 22, 27, 28, 29, 36 and 60;

iii. green pigments: pigment green 7, 26, 36 and 50;

iv. yellow pigments: pigment yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185 and 193 and v. white pigments: pigment white 6, 18 and 21.

The colour application preferably comprises one or more colourants in a total proportion of 1 to 60% by weight, preferably 3 to 55% by weight in total, more preferably of 5 to 52% by weight in total, most preferably of 7 to 50% by weight in total, based in each case on the weight of colour application.

The colour application preferably comprises at least 2 colourants, more preferably at least 3 colourants, more preferably at least 4 colourants, even more preferably at least 5, most preferably at least 6 colourants. In a preferred embodiment, the colour application comprises exactly 4 colourants or exactly 6 colourants. A preferred colour application is a decoration or comprises a plurality of decorations, preferably a plurality of identical decorations. A preferred decoration is a decoration of a container, preferably a foodstuff container, to be produced from the sheetlike composite. A preferred decoration comprises information for identification and/or promotion of a foodstuff, preferably the foodstuff to be stored in a container, to be produced from the sheetlike composite.

A preferred colour application comprises a polyvinyl acetal in a proportion of at least 10% by weight, preferably at least 15% by weight, more preferably at least 20% by weight, more preferably at least 30% by weight, most preferably at least 40% by weight, based in each case on the weight of the colour application. The polyvinyl acetal preferably works as a binder in the colour application, which has preferably been obtained from an ink by hardening this ink.

Another preferred colour application comprises nitrocelluse in a proportion in the range from 10 to 90% by weight, preferably from 20 to 90% by weight, more preferably from 30 to 90% by weight, more preferably from 40 to 80% by weight, most preferably from 45 to 75% by weight, based in each case on the weight of the colour application. The nitrocelluse preferably works as a binder in the colour application, which has preferably been obtained from an ink by hardening this ink.

Yet another preferred colour application comprises a styrene copolymer in a proportion in the range from 5 to 50% by weight, preferably from 5 to 40% by weight, more preferably from 10 to 40% by weight, more preferably from 15 to 40% by weight, most preferably from 20 to 30% by weight, based in each case on the weight of the colour application. A preferred styrene copolymer is a styrene acrylate copolymer. Preferably, the styrene acrylate copolymer has a high acid to allow for dispersing a pigment. The styrene copolymer preferably works as a binder in the colour application, which has preferably been obtained from an ink by hardening this ink.

Each preferred colour application may further comprise one selected from the group consisting of an antimicrobial agent, a further binder, an anti foaming agent, a stiffening agent, a wax, a rheology agent, and a pH-adjustment agent, or a combination of at least two thereof.

Polyvinyl Acetal

Polyvinyl acetals are thermoplastics which are prepared by reaction of polyvinyl alcohol with aldehydes or ketones. According to the aldehyde used, for example formaldehyde, acetaldehyde or butyraldehyde, a distinction is made between various polyvinyl acetals. Preferred polyvinyl acetals are polyvinyl formal and polyvinyl butyral. A particularly preferred polyvinyl acetal is polyvinyl butyral (PVB).

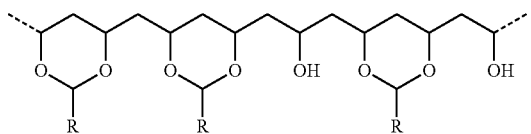

Polyvinyl formal (R = H)
Polyvinyl butyral (R = n-C$_3$H$_7$)

Outer Surface

The outer surface of the sheetlike composite is a surface of the sheetlike composite which is intended to be in contact with the environment of the container to be produced from the sheetlike composite. This does not mean that, in individual regions of the container, outer surfaces of various regions of the composite are not folded against one another or joined to one another, for example sealed to one another.

Inner Surface

The inner surface of the sheetlike composite is a surface of the sheetlike composite which is intended to be in contact with the contents of the container, preferably a foodstuff, in a container to be produced from the sheetlike composite.

Layers

Unless otherwise stated, the layers in a layer sequence can follow one another indirectly, i.e. with one or at least two intermediate layers, or directly, i.e. without intermediate layer. This is in particular the case with wording wherein there is a layer superimposed on another layer. Wording wherein a layer sequence includes a list of layers means that at least the stated layers are present in the stated sequence. This wording does not necessarily mean that these layers follow one another directly. Wording wherein two layers are adjoin one another means that these two layers follow one another directly, and therefore without intermediate layer. Therein, it is feasible that the colour application is embedded in the outer polymer layer. Hence, there may be regions of the sheetlike composite in which the outer polymer layer adjoins the carrier layer and regions in which the colour application adjoins the carrier layer. However, if the colour application adjoins the carrier layer, the outer polymer layer does not extend between the colour application and the carrier layer. Further, the outer polymer layer preferably completely covers the colour application towards the outer surface of the sheetlike composite.

Carrier Layer

Material used as carrier layer can be any suitable material which is known to the person skilled in the art for this purpose and which has strength and stiffness sufficient to provide the container with stability to such an extent that the container in essence retains its shape in the presence of its contents. This document also uses the term dimensionally stable to describe a container of this type. In particular, bags and containers made of foils without carrier layer are not dimensionally stable. Preferred materials for the carrier layer are not only several plastics but also plant-based fibre materials, in particular chemical pulps, preferably glued, bleached and/or unbleached chemical pulps, particular preference being given here to paper, cardboard and paperboard. The weight per unit area of the carrier layer is preferably in the range from 120 to 450 g/m$^2$, particularly preferably in the range from 130 to 400 g/m$^2$ and most preferably in the range from 150 to 380 g/m$^2$. A preferred paperboard or cardboard generally has a single- or multilayer structure and can have been coated on one or both sides with one or more covering layers. The residual moisture content of a preferred paperboard or cardboard is moreover less than 20% by weight, preferably from 2 to 15% by weight and particularly preferably from 4 to 10% by weight, based on the total weight of the paperboard or cardboard respectively. A particularly preferred paperboard or cardboard has a multilayer structure. It is further preferable that the paperboard or cardboard has, on the surface facing towards the outer surface, at least one, but particularly preferably at least two, covering layers as sublayers, known to the person skilled in the art as "paper coating". The Scott Bond value of a preferred paperboard or cardboard is moreover in the range from 100 to 360 J/m$^2$, preferably from 120 to 350 J/m$^2$ and particularly preferably from 135 to 310 J/m$^2$. Use of the abovementioned ranges allows provision of a composite from which it is easily possible to fold a highly leakproof container with narrow tolerances. A preferred carrier layer includes on at least one surface, preferably on each of two mutually opposite surfaces, a covering layer. Except where this is expressly excluded, it is preferable that each carrier layer includes a covering layer on each surface. It is preferable that the carrier layer is of one-piece design.

Barrier Layer

Material used as barrier layer can be any material which is known for this purpose to the person skilled in the art and which exhibits adequate barrier action in particular in relation to oxygen. It is preferable that the barrier layer is selected from
- a. a plastics barrier layer;
- b. a metal layer;
- c. a metal oxide layer; or
- d. a combination of at least two of a. to c.

It is preferable that the barrier layer is of one-piece design.

If, according to alternative a., a barrier layer is a plastics barrier layer, this preferably includes at least 70% by weight, particularly at least 80% by weight and most preferably at least 95% by weight, of at least one plastic which is known for this purpose to the person skilled in the art, in particular on account of aroma properties or, respectively, gas-barrier properties that are suitable for packaging containers. Plastics, in particular thermoplastics, that can be used here are N- or O-containing plastics, either as such or else in mixtures of two or more. A melting point of the plastics barrier layer in the range from more than 155 to 300° C., preferably in the range from 160 to 280° C. and particularly preferably in the range from 170 to 270° C. can prove advantageous according to the invention. A preferred electrically insulating barrier layer is a plastics barrier layer.

It is further preferable that the weight per unit area of the plastics barrier layer is in the range from 2 to 120 g/m$^2$, preferably in the range from 3 to 60 g/m$^2$, particularly preferably in the range from 4 to 40 g/m$^2$ and with further preference from 6 to 30 g/m$^2$. It is further preferable that the plastics barrier layer can be obtained from melts, for example via extrusion, in particular layer extrusion. It is further preferable that the plastics barrier layer can be introduced into the sheetlike composite by way of lamination. Preference is given here to incorporation of a foil into the sheetlike composite. According to another embodiment it is also possible to select plastics barrier layers which can be obtained via deposition from a solution or dispersion of plastics.

Suitable polymers are preferably those whose weight-average molar mass, determined by gel permeation chromatography (GPC) using light scattering, is in the range from $3 \cdot 10^3$ to $1 \cdot 10^7$ g/mol, preferably in the range from $5 \cdot 10^3$ to $1 \cdot 10^6$ g/mol and particularly preferably in the range from $6 \cdot 10^3$ to $1 \cdot 10^5$ g/mol. Suitable polymers that in particular can be used are polyamide (PA) or polyethylene vinyl alcohol (EVOH) or a mixture thereof.

Among the polyamides, it is possible to use any of the PAs that appear to a person skilled in the art to be suitable for the inventive use. Particular mention should be made here of PA 6, PA 6.6, PA 6.10, PA 6.12, PA 11 or PA 12 or a mixture of at least two thereof, particular preference being given here to PA 6 and PA 6.6, and further preference being given here to PA 6. PA 6 is obtainable commercially by way of example with the trademark Akulon®, Durethan® and Ultramid®. Other suitable materials are amorphous polyamides such as MXD6, Grivory®, and also Selar® PA. It is further preferable that the density of the PA is in the range from 1.01 to 1.40 g/cm$^3$, preferably in the range from 1.05 to 1.30 g/cm$^3$ and particularly preferably in the range from 1.08 to 1.25 g/cm$^3$. It is further preferable that the viscosity number of the PA is in the range from 130 to 185 ml/g and preferably in the range from 140 to 180 ml/g.

EVOH that can be used is any of the EVOHs that appear to the person skilled in the art to be suitable for the inventive use. Examples here are obtainable commercially inter alia with the trademark EVAL™ from EVAL Europe NV, Belgium in a plurality of different embodiments, examples being the grades EVAL™ F104B and EVAL™ LR171B. Preferred EVOHs have at least one, two, a plurality of, or all of, the following properties:
- ethylene content in a range from 20 to 60 mol %, preferably from 25 to 45 mol %;
- density in the range from 1.0 to 1.4 g/cm$^3$, preferably from 1.1 to 1.3 g/cm$^3$;
- melting point in the range from above 155 to 235° C., preferably from 165 to 225° C.;
- MFR (210° C./2.16 kg if $T_{M(EVOH)}$<230° C.; 230° C./2.16 kg, if 210° C.<$T_{M(EVOH)}$<230° C.) in the range from 1 to 25 g/10 min, preferably from 2 to 20 g/10 min;
- oxygen permeation rate in the range from 0.05 to 3.2 cm$^3 \cdot 20$ μm/m$^2$·day·atm, preferably in the range from 0.1 to 1 cm$^3 \cdot 20$ μm/m$^2$·day·atm.

According to alternative b. the barrier layer is a metal layer. A suitable metal layer is in principle any of the layers using metals which are known to the person skilled in the art and which can provide high impermeability to light and to oxygen. According to a preferred embodiment the metal layer can take the form of a film or of a deposited layer, e.g. after a physical gas-phase deposition process. It is preferable that the metal layer is an uninterrupted layer. According to another preferred embodiment, the thickness of the metal layer is in the range from 3 to 20 μm, preferably in the range from 3.5 to 12 μm and particularly preferably in the range from 4 to 10 μm.

Metals preferably selected are aluminium, iron or copper. A preferred iron layer can be a steel layer, e.g. in the form of a foil. It is further preferable that the metal layer is a layer using aluminium. The aluminium layer can advantageously consist of an aluminium alloy, for example AlFeMn, AlFe1.5Mn, AlFeSi or AlFeSiMn. Purity is usually 97.5% or higher, preferably 98.5% or higher, based in each case on the entire aluminium layer. In a particular embodiment the metal layer consists of an aluminium foil. The extensibility of suitable aluminium foils is more than 1%, preferably more than 1.3% and particularly preferably more than 1.5%, and their tensile strength is more than 30 N/mm$^2$, preferably more than 40 N/mm$^2$ and particularly preferably more than 50 N/mm$^2$. Suitable aluminium foils exhibit a droplet size of more than 3 mm in the pipette test, preferably more than 4 mm and particularly preferably more than 5 mm. Suitable alloys for the production of aluminium layers or aluminium foils are obtainable commercially as EN AW 1200, EN AW 8079 or EN AW 8111 from Hydro Aluminium Deutschland GmbH or Amcor Flexibles Singen GmbH. A preferred electrically conductive barrier layer is a metal barrier layer, particularly preferably an aluminium barrier layer.

When a metal foil is used as barrier layer, there can be an adhesion-promoter layer provided on one or both sides of the metal foil between the metal foil and the closest polymer layer. According to a particular embodiment of the container of the invention, however, there is no adhesion-promoter layer provided on any side of the metal foil between the metal foil and the closest polymer layer.

It is further preferable to select a metal oxide layer as barrier layer according to alternative c. Metal oxide layers that can be used are any of the metal oxide layers that are familiar to the person skilled in the art and that appear suitable for achieving a barrier effect in relation to light, water vapour and/or gas. In particular, preference is given to metal oxide layers based on the abovementioned metals aluminium, iron or copper and also to metal oxide layers based on compounds of titanium or silicon oxide. A metal oxide layer is produced by way of example via deposition of a metal oxide from a vapour onto a plastics layer, for example an oriented polypropylene film. A preferred process for this is physical gas-phase deposition.

According to another preferred embodiment the metal layer or the metal oxide layer can take the form of a layer composite made of one or more plastics layers with a metal layer. This type of layer can be obtained by way of example via vapour deposition of a metal onto a plastics layer, for example an oriented polypropylene film. A preferred process for this is physical gas-phase deposition.

Polymer Layers

In a preferred sheetlike composite according to the invention the layer sequence further comprises an inner polymer layer, wherein the inner polymer layer superimposes the barrier layer on a side of the barrier layer which is facing away from the carrier layer. Preferably, the inner polymer layer includes from 10 to 90 wt.-%, preferably from 25 to 90 wt.-%, more preferably from 30 to 80 wt.-%, in each case based on the total weight of the inner polymer layer, of a polymer produced by means of a metallocene catalyst. A preferred polymer produced by means of a metallocene catalyst is an mPE. Additionally or alternatively, the inner polymer layer preferably includes a polymer blend, wherein the polymer blend includes from 10 to 90 wt.-%, preferably from 25 to 90 wt.-%, more preferably from 30 to 80 wt.-%, of an mPE and at least 10 wt.-%, preferably at least 15 wt.-%, more preferably at least 20 wt.-%, of a further polymer, in each case based on the total weight of the polymer blend. In a preferred sheetlike composite according to the invention the layer sequence further comprises an intermediate polymer layer, wherein the intermediate polymer layer is arranged between the carrier layer and the barrier layer.

The following specifications are preferably valid for any of the inner polymer layer, the outer polymer layer and the intermediate polymer layer, or for combinations of at least two of those. However, the sheetlike composite may comprise further polymer layers for which the following specifications are also valid. The polymer layer can comprise further constituents. It is preferable that these polymer layers are introduced or, respectively, applied into the layer sequence in an extrusion process. The further constituents of the polymer layers are preferably constituents which do not adversely affect the behaviour of the polymer melt when applied as layer. The further constituents can by way of example be inorganic compounds, such as metal salts or further plastics, for example further thermoplastics. However, it is also conceivable that the further constituents are fillers or pigments, for example carbon black or metal oxides. Suitable thermoplastics that can be used for the further constituents are in particular those that are easily processable by virtue of good extrusion properties. Materials suitable in this context are polymers obtained via chain polymerisation, in particular polyesters or polyolefins, particular preference being given here to cyclic olefin copolymers (COC), and polycyclic olefin copolymers (POC), and in particular polyethylene and polypropylene, and very particular preference being given here to polyethylene. Among the polyethylenes, preference is given to HDPE, MDPE, LDPE, LLDPE, VLDPE and PE, and also to mixtures of at least two thereof. It is also possible to use mixtures of at least two thermoplastics. Another preferred polyolefin is an m-polyolefin. The melt flow rate (MFR) of suitable polymer layers is in the range from 1 to 25 g/10 min, preferably in the range from 2 to 20 g/10 min and particularly preferably in the range from 2.5 to 15 g/10 min, their density being in the range from $0.890$ g/cm$^3$ to $0.980$ g/cm$^3$, preferably in the range from $0.895$ g/cm$^3$ to $0.975$ g/cm$^3$, and more preferably in the range from $0.900$ g/cm$^3$ to $0.970$ g/cm$^3$; or in the range from $0.910$ g/cm$^3$ to $0.935$ g/cm$^3$, preferably in the range from $0.912$ g/cm$^3$ to $0.932$ g/cm$^3$, and more preferably in the range from $0.915$ g/cm$^3$ to $0.930$ g/cm$^3$. The polymer layers preferably have at least one melting point in the range from 80 to 155° C., with preference in the range from 90 to 145° C. and particularly preferably in the range from 95 to 135° C. A preferred polymer layer is a polyolefin layer, preferably a polyethylene layer or a polypropylene layer or both.

m-Polyolefin

An m-polyolefin is a polyolefin produced by means of a metallocene catalyst. A metallocene is an organometallic compound in which there is a central metal atom arranged between two organic ligands, for example cyclopentadienyl ligands. A preferred m-polyolefin is an m-polyethylene (mPE) or an m-polypropylene or both. A further preferred m-polyethylene is one selected from the group consisting of an mLDPE, an mLLDPE, and an mHDPE, or a combination of at least two thereof.

Inner Polymer Layer

In a preferred embodiment the inner polymer layer includes from 10 to 50% by weight, preferably 15 to 45% by weight, more preferably from 20 to 40% by weight, most preferably from 25 to 35% by weight, based in each case on the total weight of the inner polymer layer, of a polymer produced by means of a metallocene catalyst. In another preferred embodiment the inner polymer layer includes from 20 to 90% by weight, preferably from 30 to 90% by weight, more preferably from 40 to 90% by weight, more preferably from 50 to 90% by weight, more preferably from 60 to 90% by weight, most preferably from 70 to 85% by weight, based in each case on the total weight of the inner polymer layer, of a polymer produced by means of a metallocene catalyst.

It is preferable that the inner polymer layer consists of the polymer blend including an mPE and a further polymer. A preferred further polymer is one selected of a PE, am LDPE and an LLDPE or a combination of those. In a preferred embodiment the polymer blend includes from 10 to 50% by weight, preferably from 15 to 45% by weight, more preferably from 20 to 40% by weight, most preferably from 25 to 35% by weight, of an mPE and at least 50% by weight, preferably at least 55% by weight, more preferably at least 60% by weight, most preferably at least 65% by weight, of a further polymer, based in each case on the total weight of the polymer blend. In another preferred embodiment the polymer blend includes from 20 to 90% by weight, preferably from 30 to 90% by weight, more preferably from 40 to 90% by weight, more preferably from 50 to 90% by weight, more preferably from 60 to 90% by weight, most preferably from 70 to 85% by weight, of an mPE and at least 10% by weight, preferably at least 15% by weight, of a further polymer, based in each case on the total weight of the polymer blend. The proportions of mPE and of further polymer in the polymer blend here are preferably combined in such a way that the sum of the proportions is 100% by weight. In each case the preferred proportions of mPE and of further polymer in the polymer blend are combined in such a way that the sum of the proportions is not more than 100% by weight. It is preferable that the inner surface of the sheetlike composite is a surface of the inner polymer layer that faces away from the barrier layer. The innersurface of the sheetlike composite here preferably is the surface which in a container to be produced from the sheetlike composite faces predominantly inwards, i.e. in particular is in direct contact with a food contained in the container.

Outer Polymer Layer

The outer polymer layer preferably comprises a polyethylene or a polypropylene or both. Here, preferred polyethylenes are LDPE, mPE and HDPE or mixtures of those. A preferred outer polymer layer comprises at least 50% by weight, preferably at least 60% by weight, more preferably 70% by weight, more preferably 90% by weight, most preferably 90% by weight, in each case based on the weight of the outer polymer layer, of an LDPE.

Melting Points

A preferred m-polyolefin is characterised by at least one first melting point and one second melting point. It is preferable that the m-polyolefin is characterised by a third melting point in addition to the first and the second melting point. A preferred first melting point is in the range from 84 to 108° C., preferably from 89 to 103° C., more preferably from 94 to 98° C. A preferred further melting point is in the range from 100 to 124° C., preferably from 105 to 119° C., more preferably from 110 to 114° C.

Adhesion, Adhesion-Promoter Layer

There can be an adhesion-promoter layer located between layers of the sheetlike composite which do not adjoin each other. In particular, there can be an adhesion-promoter layer located between the barrier layer and the inner polymer layer or the carrier layer and the barrier layer. Plastics which can be used as adhesion promoters in an adhesion-promoter layer are any of those which, by virtue of functionalisation by means of suitable functional groups, are suitable to produce a secure bond via formation of ionic bonds or covalent bonds to a surface of a respective adjacent layer. The materials are preferably functionalised polyolefins obtained via copolymerisation of ethylene with acrylic acids such as acrylic acid or methacrylic acid, crotonic acid, acrylates, acrylate derivatives or carboxylic anhydrides containing double bonds, for example maleic anhydride, or at least two thereof. Among these, preference is given to polyethylene-maleic anhydride graft polymers (EMAH), ethylene-acrylic acid copolymers (EAA) or ethylene-methacrylic acid copolymers (EMAA), which are marketed by way of example with the trademarks Bynel® and Nucrel®0609HSA by DuPont or Escor®6000ExCo by ExxonMobil Chemicals.

According to the invention it is preferable that the adhesion between a carrier layer, a polymer layer or a barrier layer and the respective closest layer is at least 0.5 N/15 mm, preferably at least 0.7 N/15 mm and particularly preferably at least 0.8 N/15 mm. In an embodiment of the invention it is preferable that the adhesion between a polymer layer and a carrier layer is at least 0.3 N/15 mm, preferably at least 0.5 N/15 mm and particularly preferably at least 0.7 N/15 mm. It is further preferable that the adhesion between a barrier layer and a polymer layer is at least 0.8 N/15 mm, preferably at least 1.0 N/15 mm and particularly preferably at least 1.4 N/15 mm. In the event that a barrier layer follows a polymer layer indirectly by way of an adhesion-promoter layer it is preferable that the adhesion between the barrier layer and the adhesion-promoter layer is at least 1.8 N/15 mm, preferably at least 2.2 N/15 mm and particularly preferably at least 2.8 N/15 mm. In a particular embodiment the adhesion between the individual layers is so strong that the adhesion test leads to tearing of a carrier layer, the term used in the event of paperboard or cardboard as carrier layer being paperboard or cardboard fibre tear.

Container Precursor

A container precursor is a precursor of a closed container produced during the production of a closed container. The container precursor here preferably includes the sheetlike composite in cut-to-size form. A preferred container precursor has been cut to size and is designed for the production of a single closed container. Another term used for a preferred container precursor which has been cut to size and is designed for the production of a single closed container is also referred to a jacket or a sleeve. The jacket or sleeve here includes the folded sheetlike composite. The jacket or sleeve moreover includes a longitudinal seam and is open in a top region and in a base region. The term tube is often used for a typical container precursor which has been cut to size and is designed for the production of a plurality of closed containers.

A preferred container precursor includes the sheetlike composite according to the invention in a manner such that the sheetlike composite has been folded at least once, preferably at least twice, more preferably at least 3 times, most preferably at least 4 times, thereby obtaining longitudinal folds. A preferred container precursor is of a one-piece design. It is particularly preferable that a bottom region of the container precursor is of a one-piece design with a lateral region of the container precursor.

Container

The closed container of the invention can have a plurality of different shapes, but preference is given to a structure that is in essence a rectangular parallelepiped. It is moreover possible that the entire area of the container is composed of the sheetlike composite, or that the container has a two- or multipart structure. In the case of a multipart structure it is conceivable that other materials are also used alongside the sheetlike composite, an example being plastic, which in particular can be used in the top or bottom regions of the container. However, it is preferable here that at least 50%, particularly at least 70% and more preferably at least 90%, of the area of the container is composed of the sheetlike composite. The container can moreover comprise a device for the discharge of the contents. This can by way of example be formed from plastic and applied to the external side of the container. It is also conceivable that this device has been integrated into the container via "direct injection moulding". According to a preferred embodiment the container of the invention has at least one folded edge, preferably from 4 to 22, or even more folded edges, particularly preferably from 7 to 12 folded edges. For the purposes of the present invention the expression folded edge applies to regions produced when an area is folded. Examples of folded edges that may be mentioned are the longitudinal regions where two respective wall areas of the container meet. These edges are also referred to as longitudinal edges. The container walls in the container are preferably the areas of the container, surrounded by edges. It is preferable that the closed container includes no base that is not of single-piece design with the sheetlike composite or no lid that is not of single-piece design with the sheetlike composite, or both.

Foodstuff

A preferred closed container of the invention includes a foodstuff. Materials that can be regarded as foodstuff are any of the solid or liquid foodstuffs known to the person skilled in the art for human consumption, and also those for consumption by animals. Preferred foodstuffs are liquid above 5° C., examples being dairy products, soups, sauces, and noncarbonated drinks There are various methods for filling the container or the container precursor. A first possibility is that the foodstuff and the container or the container precursor are separately, before the filling process, sterilised to the greatest possible extent via suitable measures such as treatment of the container or of the container precursor with $H_2O_2$, UV radiation or other suitable high-energy radiation, plasma or a combination of at least two thereof, and also heating of the food, and that the container or the container precursor is then filled. This filling method is often termed "aseptic filling", and is preferred according to the invention. In another method that is widely used, in addition to or else instead of aseptic filling, the container or container precursor filled with foodstuff is heated to reduce the number of germs. This is preferably achieved via pasteurisation or autoclaving. In this procedure it is also possible to use less sterile foodstuffs and containers or container precursors.

Hole, Opening Aid

In order to provide easier opening of the closed container of the invention, the carrier layer can comprise at least one hole. In a particular embodiment the hole has been covered at least by a barrier layer, and preferably a polymer layer, particularly preferably one of the outer polymer layer, the inner polymer layer, and the intermediate polymer layer or combinations of at least two of those, as hole-covering layers. There can moreover be one or more further layers, in particular adhesion-promoter layers, provided between the abovementioned layers. It is preferable here that the hole-covering layers have been joined to one another at least to some extent, preferably at least 30%, with preference at least 70% and with particular preference at least 90% of the area formed by the hole. According to a particular embodiment it is preferable that the hole penetrates through the entire sheetlike composite and is covered by a closure or opening device that seals the hole. In connection with a preferred embodiment the hole provided in the carrier layer can have any shape that is known to the person skilled in the art and is suitable for various closures, drinking straws or opening aids. Opening of a closed container is mostly achieved by destroying, at least to some extent, the hole-covering layers covering the hole. This destruction can be achieved via cutting, pressing into the container or pulling out of the container. The destruction can be achieved via an openable closure joined to the container and arranged in the region of the hole, mostly above the hole, or via a drinking straw which is forced through the hole-covering layers covering the hole.

TEST METHODS

The following test methods were used for the purposes of the invention. Unless otherwise stated the measurements were made at ambient temperature 25° C., ambient air pressure 100 kPa (0.986 atm) and relative humidity 50%.

MFR Value

The MFR value is measured in accordance with the standard ISO 1133-1:2012-03 (unless otherwise stated at 190° C. with 2.16 kg).

Density

Density is measured in accordance with the standard ISO 1183-1:2012-05.

Melting Point

Melting point is determined according to the DSC method of ISO 11357-1 and -5. The equipment is calibrated in accordance with the manufacturer's instructions with reference to the following measurements:
  indium temperature—onset temperature,
  enthalpy of fusion of indium,
  zinc temperature—onset temperature.

Viscosity Number of PA

The viscosity number of PA is measured in accordance with the standard ISO 307 in 95% sulphuric acid.

Oxygen Permeation Rate

Oxygen permeation rate is determined in accordance with the standard ISO 14663-2 Annex C at 20° C. and 65% relative humidity.

Paperboard Moisture Content

Paperboard moisture content is measured in accordance with the standard ISO 287:2009.

Adhesion of Layers

Adhesion between two adjacent layers is determined by fixing these onto 90° peel test equipment, for example a "German rotating wheel fixture" from Instron, on a rotating roll which rotates at 40 mm/min during the measurement. The samples were cut to size in advance, into strips of width 15 mm. At one side of the sample the sublayers are separated from one another, and the separated end is clamped into a vertically upwards oriented tensile apparatus. The tensile apparatus has attached measurement equipment for determining the tensile force. During the rotation of the roll, the force required to separate the sublayers from one another is measured. This force corresponds to the adhesion between the layers, and is stated in N/15 mm. The separation of the individual layers can be achieved by way of example mechanically, or via a specific pretreatment, for example via softening of the sample for 3 min in 30% acetic acid at 60° C.

Molecular Weight Distribution

Molecular weight distribution is measured by gel permeation chromatography, using light scattering: ISO 16014-3/-5.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Bending Resistance

The bending resistance is determined according to the bending test method described in the standard ISO 2493-2:2011. For the measurement an L&W Bending Tester code 160 of Lorentzen & Wettre, Sweden is applied. As described in the standard, samples used to determine the bending resistances have a width of 38 mm and a clamping length of 50 mm. Therein, only samples having no crease line, fold or edge are used in the bending test. The samples are selected in accordance with ISO 186. The bending resistance is determined by deflecting the sample by 15°. The bending test specified by the standard ISO 2493-2:2011 is a two-point bending test. As referred to herein, a direction in which the sheetlike composite or the carrier layer has a bending resistance is a direction of a straight line connecting the two attack points of the two-point bending test. Preferably, this direction is a direction in which the sheetlike composite or the carrier layer respectively curves upon bending. Perpendicular to the direction of the bending resistance the sheetlike composite or carrier layer preferably forms a straight fold line if the sample is deflected by an angle large enough to fold it.

Compression Test

For this test, 5 containers are manufactured according to corresponding example or comparative example. The purpose of the test is to determine the compressive strength along the longitudinal axis of the container, i.e. the compressive strength in the direction of the longitudinal folds. It may also be used to assess the resilience of filled containers in the static case of storage and in the dynamic case of transportation. The compression test is carried out on the individual containers in accordance with DIN EN ISO12048. The preceding storage of the containers is carried out in accordance with DIN EN ISO 2233:2000. The measuring device used is TIRAtest 28025 (Tira GmbH; Eisfelder Strasse 23/25; 96528 Schalkau, Germany). The mean value of the maximum breaking load (load value) is determined. This describes the value that leads to the failure of the containers.

Adhesion of Colour Application Along Longitudinal Folds

The adhesive strength of a colour layer is understood as meaning the ability of the colour layer to resist forces when a strip of adhesive tape is torn off the surface of the colour layer along longitudinal folds. In the test, the adhesive tape used is a 20 mm-wide Tesaband 4104 marketed by Beiersdorf A G, Hamburg. The container made from the laminate to be tested is placed with the colour layer and the longitudinal fold to be tested facing upwards on a hard, smooth, level surface. For each test run-through, a strip of Tesaband 4104 is glued to the colour layer over a length of at least 30 mm along the longitudinal fold and pressed down around the longitudinal edge evenly with the thumb. The assessment is made within 30 seconds of the Tesaband being glued down. If the adhesive tape stays longer on the colour layer, this can lead to divergent results. The assessment is made by stripping off the strip of adhesive tape along the longitudinal fold in a jerky movement at an angle of 90°. Three test run-throughs are carried out at different sites of the colour layer along longitudinal folds. The results are assessed with the naked, wherein + means that the colour layer does not come off and − means that he colour layer comes off at different points.

The invention is described in more detail below via Examples and drawings, wherein the Examples and drawings do not imply any restriction of the invention. The drawings are moreover diagrammatic and not true to scale.

For the example according to the invention, laminates with the following layer sequence were produced by means of an extrusion coating system which is standard in laminar extrusion processes.

Laminate Production

Laminates consisting of the layers given in table 1 above are produced applying an extrusion coating system of the firm Davis Standard. Therein, the extrusion temperature is in the range from about 280 to 310° C. Temperature variations of ±6° C. are understood to be within normal tolerances. Grammage variations of ±3 g/m² are within normal tolerances as well. In a first step, one hole for each container to be produced from the laminate is applied to the carrier layer by die cutting. Subsequently, the colour application is printed onto the carrier layer by flexographic printing. Therein, 4 inks of different colours of the series TS 600 of the firm Siegwerk Druckfarben AG & Co. KGaA, Germany are applied in 4 subsequent printing steps, wherein after each printing step the applied ink is dried. Thus, a four-colour print decoration is obtained. The printed carrier layer is creased, thereby obtaining crease lines in the carrier layer. In particular, longitudinal crease lines, as depicted in FIG. 2 below, are introduced. Therein, the longitudinal crease lines are oriented perpendicular to the running direction or fibre run of the paper board material of the carrier layer. Hence, in the cuboid container to be produced the running direction or fibre run will be oriented perpendicular to the four longitudinal edges of the container. Subsequently, the outer polymer layer is applied to the decoration, thereby covering the holes. In a following step, the barrier layer is applied to the carrier layer together with the intermediate polymer layer. Subsequently, the adhesion promoter layer and the inner polymer layer are co-extruded onto the barrier layer. In order to allow for applying of the several polymer layers, the polymers are molten in an extruder. For applying a polymer of a layer, the obtained polymer melt is fed via a feed block into a nozzle and from there extruded to the substrate.

Container Production

Further, the laminate obtained as described above is cut into sections, wherein each section is suitable for producing a single container from it. Therein, each of the sections comprises one of the holes mentioned above. From each section a container precursor in form of a sleeve as shown in FIG. 3 is obtained by folding along the 4 longitudinal crease lines and sealing of overlapping fold areas (longitudinal rims) onto each other, thereby obtaining a longitudinal seam. From this container precursor, a closed container as shown in FIG. 4 ("brick-type") is formed using a filling

TABLE 1 layer sequence used in the example according to the invention

| layer | material | grammage [g/m²] |
|---|---|---|
| outer polymer layer | LDPE 19N430 of Ineos GmbH, Cologne, Germany | 22 |
| colour application | TS 600 of Siegwerk Druckfarben AG & Co. KGaA, Germany | — |
| carrier layer | Liquid Packaging Board Stora Enso Natura T Duplex, double coating layer, Scott-Bond 200 J/m², residual moisture 7.5% | 210 |
| intermediate polymer layer | LDPE 19N430 of Ineos GmbH, Cologne, Germany | 22 |
| barrier layer | aluminium foil EN AW 8079 of Hydro Aluminium Deutschland GmbH | here: thickness 6 μm |
| adhesion promoter layer | co-extrudate (1) Escor 6000 HSC of Exxon Mobil Corporation and (2) LDPE 19N430 of Ineos GmbH, Cologne, Germany | (1) - 4 (2) - 22 |
| inner polymer layer | blend of (1) 30 wt.-% of an mLDPE and (2) 70 wt.-% of an LDPE | 22 | machine CFA 712 of SIG Combibloc, Linnich, Germany. Therein, a bottom region is formed by folding and closed by heat sealing. Thus, a cup with an open top region is obtained. The cup is sterilised using hydrogen peroxide. Further, the cup is filled with orange juice. By further folding and ultrasound sealing the top region of the cup, having the hole, is closed. Thus, a closed and filled container is obtained. Further, an opening aid is attached to the container, covering the hole.

For further examples according to the invention and comparative examples, laminates with the layer sequence shown in table 2 and the layer materials shown in tables 2 and 3 below have been produced by means of the same extrusion coating system as in the examples above.

TABLE 2 layer sequence used in the further examples according to the invention and in the comparative examples as discussed below

| layer | material | grammage [g/m²] |
|---|---|---|
| outer polymer layer | see table 3 | see table 3 |
| colour application | TS 600 of Siegwerk Druckfarben AG & Co. KGaA, Germany | — |
| carrier layer | see table 3 | see table 3 |
| intermediate polymer layer | LDPE 19N430 of Ineos GmbH, Cologne, Germany | 22 |
| barrier layer | aluminium foil EN AW 8079 of Hydro Aluminium Deutschland GmbH | here: thickness 6 μm |
| adhesion promoter layer | co-extrudate (1) Escor 6000 HSC of Exxon Mobil Corporation and (2) LDPE 19N430 of Ineos GmbH, Cologne, Germany | (1) - 4 (2) - 22 |
| inner polymer layer | blend of (1) 30 wt.-% of an mLDPE and (2) 70 wt.-% of an LDPE | 22 |

TABLE 3 materials and grammages used for the carrier layer and the outer polymer layer in the further examples according to the invention and in the comparative examples as discussed below, with: (1) Liquid Packaging Board Stora Enso Natura T Duplex, double coating layer, Scott-Bond 250 J/m², residual moisture 7.5%, (2) Liquid Packaging Board Stora Enso Natura T Duplex, double coating layer, Scott-Bond 200 J/m², residual moisture 7.5%.

| | material of carrier layer | grammage of carrier layer [g/m²] | material of outer polymer layer | grammage of outer polymer layer [g/m²] |
|---|---|---|---|---|
| comparative example 1 | (1) | 320 | none | 0 |
| comparative example 2 | (1) | 320 | none | 0 |
| example 1 | (1) | 320 | LDPE 19N430 of Ineos GmbH, Cologne, Germany | 22 |
| comparative example 3 | (2) | 210 | none | 0 |
| comparative example 4 | (2) | 210 | none | 0 |
| example 2 | (2) | 210 | LDPE 19N430 of Ineos GmbH, Cologne, Germany | 22 |

Laminate Production

Laminates consisting of the layers given in the tables 2 and 3 above have been produced applying an extrusion coating system of the firm Davis Standard. Therein, the extrusion temperature is in the range from about 280 to 310° C. Temperature variations of ±6° C. are understood to be within normal tolerances. Grammage variations of ±3 g/m² are within normal tolerances as well. In a first step, one hole for each container to be produced from the laminate has been applied to the carrier layer by die cutting. Subsequently, the colour application has been printed onto the carrier layer by flexographic printing. Therein, 4 inks of different colours of the series TS 600 of the firm Siegwerk Druckfarben AG & Co. KGaA, Germany have been applied in 4 subsequent printing steps, wherein after each printing step the applied ink has been dried. Thus, a four-colour print decoration has been obtained. The printed carrier layer has been creased, thereby obtaining crease lines in the carrier layer. In particular, longitudinal crease lines, as depicted in FIG. 2 below, have been introduced. Therein, the longitudinal crease lines have been oriented perpendicular to the running direction or fibre run of the paper board material of the carrier layer for the examples 1 and 2 and for the comparative examples 2 and 4. Hence, in the cuboid container which has been produced from the laminates of the aforementioned examples and comparative examples as provided below, the running direction or fibre run is oriented perpendicular to the four longitudinal edges of the container. In case of the comparative examples 1 and 3, the longitudinal crease lines have been oriented parallel to the running direction or fibre run of the paper board material of the carrier layer. Thus, here the running direction or fibre run is oriented in parallel to the four longitudinal edges of the containers produced from the laminates. Subsequently, the outer polymer layer has been applied to the decoration, thereby covering the holes—if applicable according to table 3. In a following step, the barrier layer has been applied to the carrier layer together with the intermediate polymer layer. Subsequently, the adhesion promoter layer and the inner polymer layer according to the above test method. In addition, for each of the further examples and the comparative examples 5 closed containers have been produced without filling them. The weight of these empty closed containers has been measured and the arithmetic mean has been determined as the empty weight of the containers of the corresponding example or comparative example.

The results of the tests performed on the laminates and containers of the further examples and the comparative examples are shown in table 4 below.

TABLE 4 experimental results found for the further examples according to the invention and the comparative examples

|  | fibre run orientation in carrier layer withrespect to longitudinal folds | bending resistance in direction of longitudinal crease lines [mN · m] | bending resistance in direction perpendicular to longitudinal crease lines [mN · m] | resistance to compression | adhesion of colour applications along longitudinal folds | empty weight of container [g] |
|---|---|---|---|---|---|---|
| comparative example 1 | Parallel | 340 | 190 | + | + | 20 |
| comparative example 2 | Perpendicular | 197 | 346 | ++ | − | 20 |
| example 1 | Perpendicular | 195 | 345 | ++ | + | 22 |
| comparative example 3 | Parallel | 230 | 120 | − | + | 11 |
| comparative example 4 | Perpendicular | 124 | 234 | + | − | 11 |
| example 2 | Perpendicular | 126 | 235 | + | + | 12 | have been co-extruded onto the barrier layer. In order to allow for applying of the several polymer layers, the polymers were molten in an extruder. For applying a polymer of a layer, the obtained polymer melt was fed via a feed block into a nozzle and from there extruded to the substrate.

For each of the further examples and the comparative examples, the bending resistances of the laminates in the directions in parallel and perpendicular to the direction of the longitudinal crease lines has been measured according to the above test method.

Container Production

Further, the laminate obtained as described above has been cut into sections, wherein each section is suitable for producing a single container from it. Therein, each of the sections comprises one of the holes mentioned above. From each section a container precursor in form of a sleeve as shown in FIG. 3 has been obtained by folding along the 4 longitudinal crease lines and sealing of overlapping fold areas (longitudinal rims) onto each other, thereby obtaining a longitudinal seam. From the container precursor, a closed container as shown in FIG. 4 ("brick-type") has been formed using a filling machine CFA 712 of SIG Combibloc, Linnich, Germany. Therein, a bottom region has been formed by folding and closed by heat sealing. Thus, a cup with an open top region has been obtained. The cup has been sterilised using hydrogen peroxide. Further, the cup has been filled with water. By further folding and ultrasound sealing the top region of the cup, having the hole, has been closed. Thus, a closed and filled container has been obtained. Further, an opening aid has been attached to the container, covering the hole. The compression test as described above in the test methods section has been conducted on 5 closed and filled containers for each of the further examples and the comparative examples. Further, the adhesion of the decoration, i.e. the 4 colour applications, along the longitudinal crease lines and folds produced along them has been determined The resistance to compression has been determined according to the above compression test, wherein in table 4 "++" means a better resistance to compression than "+", and "+" means a better resistance to compression than "−".

As can been seen from the results presented in table 4, the invention allows for the production of dimensionally stable foodstuff containers with an advantageous balance of resistance to compression and adhesion of a decoration along the longitudinal folds of the container. Example 2 further shows that such an advantageous balance can even be obtained according to the invention using thinner cardboards for the carrier layer and thus for containers with reduced empty weight which is particularly favourable for transporting the containers. Moreover, containers having good resistance to compression, can be stacked without suffering from significant damages, in particular without significant bulging outward of the containers in the lower part of the stack (see FIGS. 5 and 6). Hence, containers with good resistance to compression can be densely packed in vertical and horizontal directions for storing and transporting them in a space saving manner.

Figure 5:
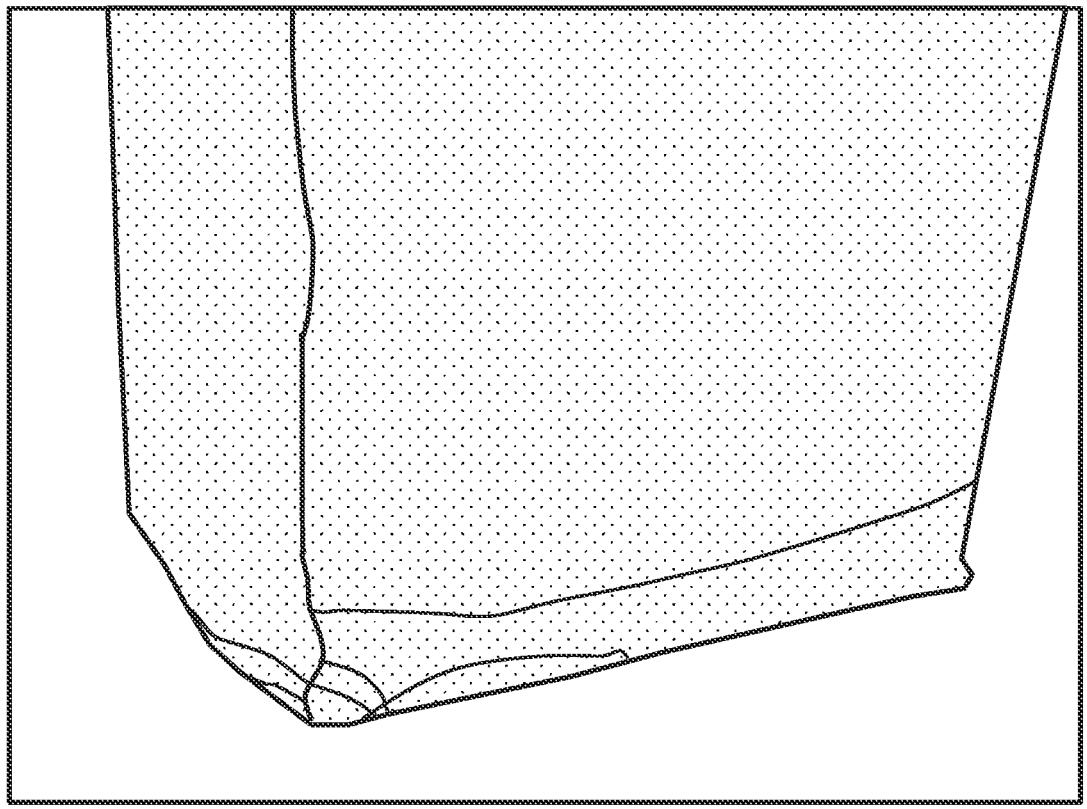
Figure 6:
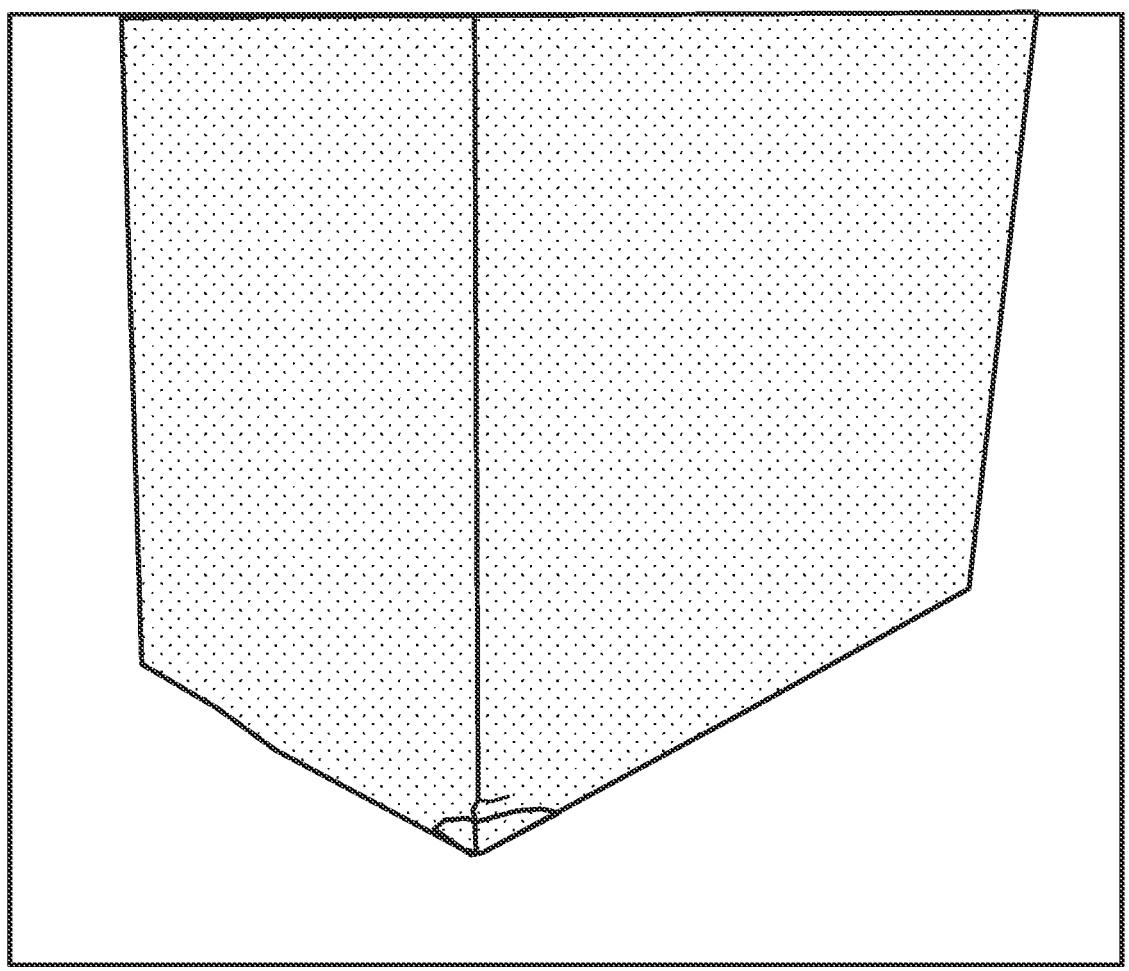

FIG. 5 a photograph of the bottom region of a closed container of comparative example 3 after a compression test; and FIG. 6 a photograph of the bottom region of a closed container of comparative example 4 after a compression test.

Figure 1:
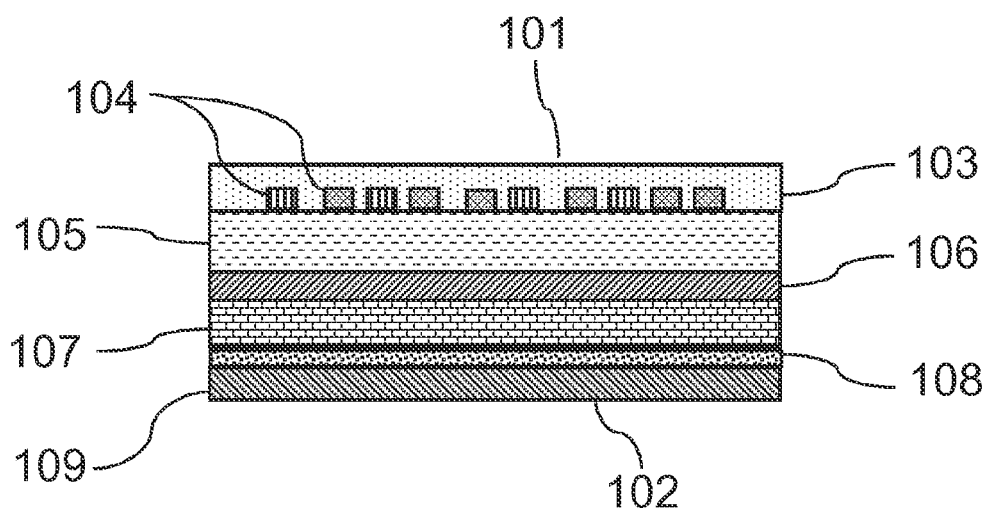
FIG. 1 is a diagrammatic cross section through a sheetlike composite of the invention.

FIG. 1 shows a diagrammatic cross section through a sheetlike composite 100 of the invention. The sheetlike composite 100 comprises as a layer sequence in a direction from an outer surface 101 of the sheetlike composite 100 to an inner surface 102 of the sheetlike composite 100: an outer polymer layer 103, a colour application 104, a carrier layer 105, an intermediate polymer layer 106, a barrier layer 107, an adhesion promoter layer 108 and an inner polymer layer 109. Therein, the colour application comprises 2 prints of different colours. The layers of the sheetlike composite 100 of FIG. 1 are the layers given in table 1 in the context of the example according to the invention above.

Figure 2:
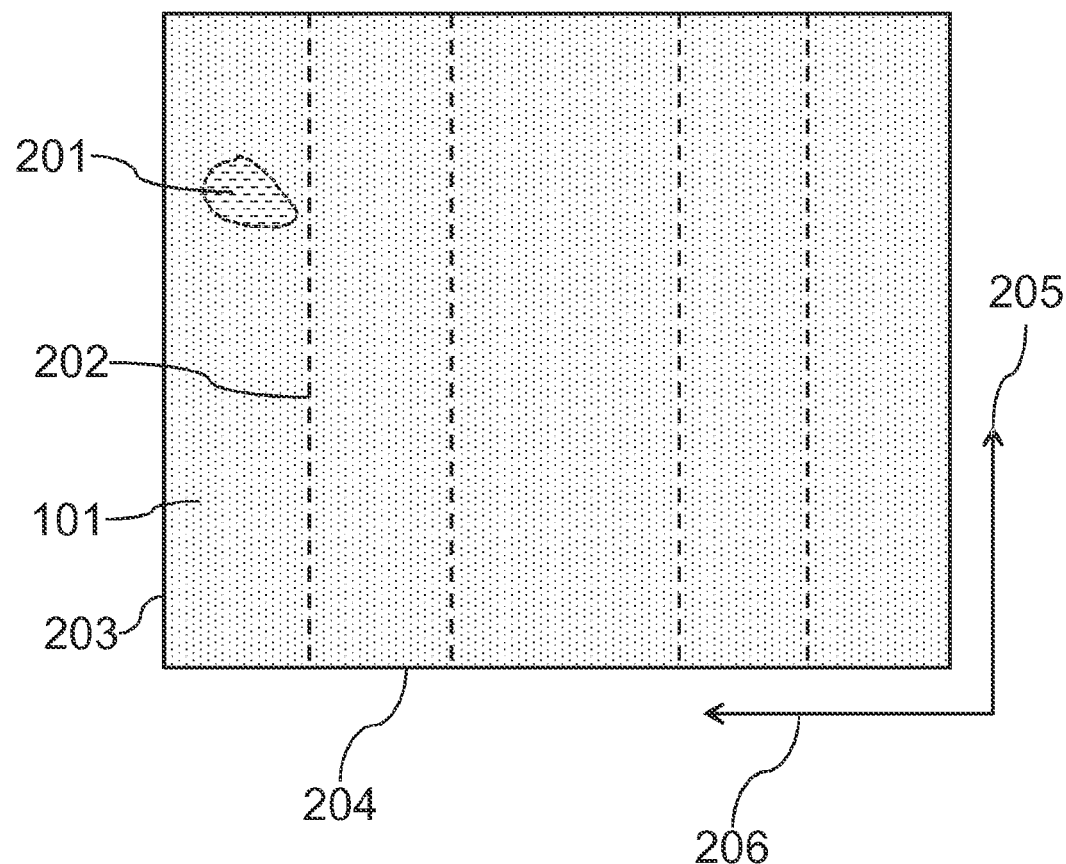
FIG. 2 is a diagrammatic top view of the sheetlike composite of FIG. 1.

FIG. 2 shows a diagrammatic top view of the sheetlike composite 100 of FIG. 1. The sheetlike composite 100 comprises four longitudinal crease lines 202 which each are oriented in a first direction 205 which is a longitudinal direction. In the first direction 205, the sheetlike composite 100 has a first bending resistance of 126 mN·m. A further direction 206 is perpendicular to the first direction 205. In the further direction 206 the sheetlike composite 100 has a further bending resistance of 235 mN·m. The sheetlike composite further comprises longitudinal rims 203 and transversal rims 204. The longitudinal crease lines 202 connect the two transversal rims 204 with each other. The carrier layer 105 comprises a plurality of fibres 201. Therein, a fibre run of the carrier layer 105 is oriented in the further direction 206. Hence, the carrier layer 105 has a transverse fibre. The sheetlike composite 100 is a pre-cut for the production of a single closed container 400 as shown in FIG. 4.

Figure 3:
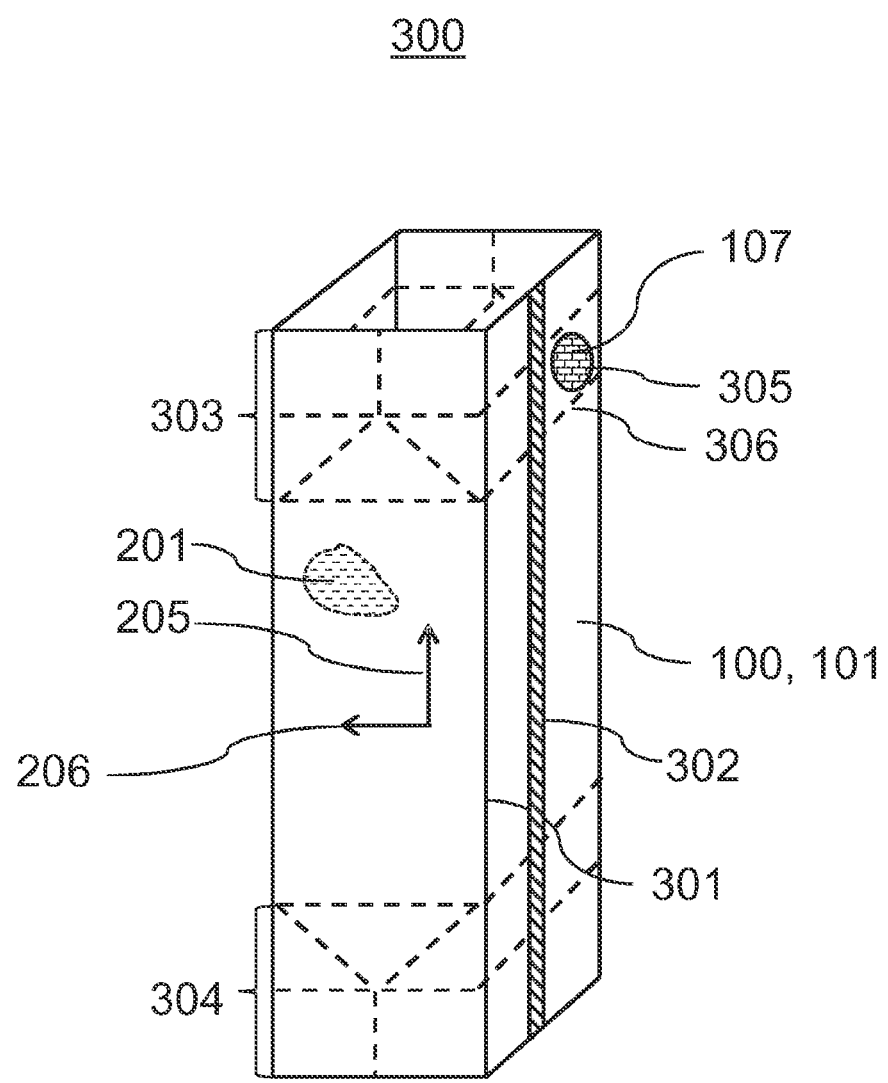
FIG. 3 is a diagrammatic view of a container precursor of the invention.

FIG. 3 shows a diagrammatic view of a container precursor 300 of the invention. The container precursor 300 shown here is a sleeve which is suitable for the production of a single closed container 400, in particular of the closed container 400 shown in FIG. 4. Further, the sleeve includes a top region 303 and a bottom region 304. The top region 303 and the bottom region 304 respectively include further crease lines 306 which are not longitudinal crease lines 202. The top region 303 and the bottom region 304 can respectively be closed by folding along the further crease lines 306 and sealing. The closed container 400 as shown in FIG. 4 can thus be obtained from the sleeve. Accordingly, the container precursor 300 is a precursor produced in the process for producing the closed container 400. In the container precursor 300 the sheetlike composite 100 has been folded along the longitudinal crease lines 202, thereby obtaining four longitudinal folds 301. The sleeve moreover includes a longitudinal seam 302 along which the longitudinal rims 203 of the sheetlike composite 100 have been sealed to one another. The longitudinal folds 301 as well as the longitudinal seam 302 are each oriented in the first direction 205, hence perpendicular to the further direction 206 which is the direction of the transverse fibre of the carrier layer 105. The container precursor 300 further comprises a hole 305 in the carrier layer 105. This hole 305 is covered by the outer polymer layer 103 (not shown here), the intermediate polymer layer 106 (not shown here), the barrier layer 107, the adhesion promoter layer 108 (not shown here) and the inner polymer layer 109 (not shown here) as hole-covering layers. As can be seen in FIG. 3, the outer surface 101 is facing outward, hence to the environment of the container precursor 300.

Figure 4:
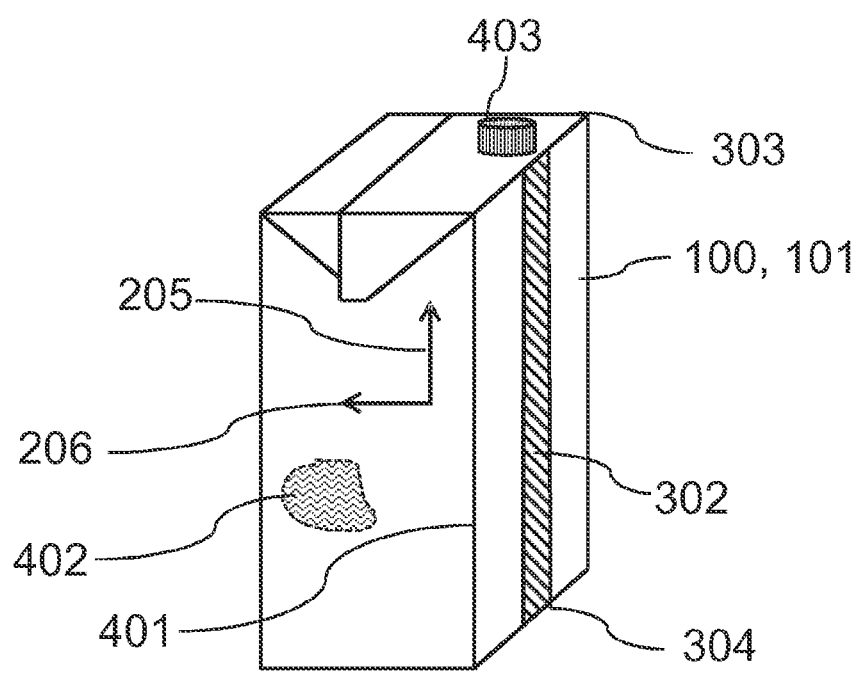
FIG. 4 is a diagrammatic view of a closed container of the invention.

FIG. 4 shows a diagrammatic view of a closed container 400 of the invention. The closed container 400 can be obtained via folding of the container precursor 300 of FIG. 3 along the further crease lines 306 and sealing of folded regions to seal the top region 303 and the bottom region 304. Accordingly, the closed container 400 includes the sheetlike composite 100 of FIG. 1. The closed container 400 further includes at least 12 edges, 4 of which are longitudinal edges 401. The closed container 400 surrounds an interior which includes a foodstuff 402. The foodstuff 402 can be liquid, but can also include solid constituents. The closed container 400 shown in FIG. 4 is of one-piece design. The closed container 400 can moreover be provided with a fitment to improve ease of opening. Here, the hole 305 in the carrier layer 105 of the sheetlike composite 100 is covered by a cap 403 with an opening aid which is attached to the closed container 400. The closed container 400 is of the so called brick-type which has a cuboid shape.

FIG. 5 shows a photograph of the bottom region of a closed container 500 of comparative example 3 after a compression test has been performed on it with a maximum compression load of 90 N. It can be seen that due to the compression in the direction of the container height the bottom region of the container 500 has been damaged significantly. In particular, the container 500 bulges outward in its bottom region. Therefore, containers 500 according to comparative example 3 cannot be stored in a very dense and space saving manner. Stacking these containers 500, leads to compression loads on the lower containers 500 in the stack, which are sufficient to produce the damages shown in FIG. 5. In consequence of these damages, the containers 500 occupy more space in the horizontal direction.

FIG. 6 shows a photograph of the bottom region of a closed container 600 of comparative example 4 after the compression test has been performed on it with a maximum compression load of 140 N. It can be seen that the bottom region of this container 600 has been damaged significantly less than the closed container 500 according to comparative example 3 as shown in FIG. 5. Hence, the containers 600 according to comparative example 4 can be stored and transported more densely packed. According to table 4 above, on average similar results of compression tests have been obtained for the comparative example 1 and the example 2 according to the invention. The containers of the comparative example 2 and the example 1 according to the invention showed essentially no damages under the same compression load.

LIST OF REFERENCE NUMERALS 100 sheetlike composite of the invention
101 outer surface
102 inner surface
103 outer polymer layer
104 colour application
105 carrier layer
106 intermediate polymer layer
107 barrier layer
108 adhesion promoter layer
109 inner polymer layer
201 plurality of fibres
202 longitudinal crease line
203 longitudinal rim
204 transversal rim
205 first direction
206 further direction
300 container precursor of the invention
301 longitudinal fold
302 longitudinal seam
303 top region
304 bottom region
305 hole
306 further crease line
400 closed container of the invention 401 longitudinal edge
402 foodstuff
403 cap with opening aid
500 closed container of comparative example 3 after compression test
600 closed container of comparative example 4 after compression test

The invention claimed is:
1. A sheetlike composite, comprising as a layer sequence in a direction from an outer surface of the sheetlike composite to an inner surface of the sheetlike composite
   a) an outer polymer layer,
   b) a colour application,
   c) a carrier layer, and
   d) a barrier layer;
   wherein the sheetlike composite comprises at least one longitudinal crease line;
   wherein the at least one longitudinal crease line is oriented in a first direction;
   wherein the sheetlike composite has a first bending resistance in the first direction;
   wherein a further direction is perpendicular to the first direction;
   wherein the sheetlike composite has a further bending resistance in the further direction;
   wherein the first bending resistance is less than the further bending resistance,
   wherein each bending resistance is determined according to a two-point bending test described in the standard ISO 2493-2:2011,
   wherein, for the two-point bending test, samples of widths of 38 mm and clamping lengths of 50 mm are prepared in accordance with ISO 186,
   wherein the samples do not include any crease line, fold or edge,
   wherein a direction in which the sheetlike composite has a bending resistance is a direction of a straight line connecting two attack points of the two-point bending test used to determine this bending resistance.
2. The sheetlike composite according to claim 1, wherein a ratio of the first bending resistance to the further bending resistance is in the range from 1:10 to 1:1.5.
3. The sheetlike composite according to claim 1, wherein the carrier layer comprises a plurality of fibres,
   wherein at least 55% of the fibres of the plurality of fibres incline an angle of less than 30° with the further direction.
4. The sheetlike composite according to claim 1, wherein the outer polymer layer is an outermost layer of the sheetlike composite.
5. The sheetlike composite according to claim 1, wherein the colour application adjoins the carrier layer.
6. The sheetlike composite according to claim 1, wherein the carrier layer includes one selected from the group consisting of paperboard, cardboard, and paper, or a combination of at least two thereof.
7. The sheetlike composite according to claim 1, wherein the colour application comprises at least 4 wt.-% of at least one colourant, based on the weight of the colour application.
8. The sheetlike composite according to claim 1, wherein the outer polymer layer comprises at least 50 wt.-% of a polyethylene, based on the weight of the outer polymer layer.
9. A container precursor, comprising the sheetlike composite according to claim 1.
10. A container precursor, comprising a sheetlike composite;
    wherein the sheetlike composite comprises as a layer sequence in a direction from an outer surface of the sheetlike composite to an inner surface of the sheetlike composite
    a) an outer polymer layer,
    b) a colour application,
    c) a carrier layer, and
    d) a barrier layer;
    wherein the sheetlike composite has been folded, thereby forming at least one longitudinal fold of the container precursor;
    wherein the at least one longitudinal fold is oriented in a first direction;
    wherein the sheetlike composite has a first bending resistance in the first direction;
    wherein a further direction is perpendicular to the first direction;
    wherein the sheetlike composite has a further bending resistance in the further direction;
    wherein the first bending resistance is less than the further bending resistance,
    wherein each bending resistance is determined according to a two-point bending test described in the standard ISO 2493-2:2011,
    wherein, for the two-point bending test, samples of widths of 38 mm and clamping lengths of 50 mm are prepared in accordance with ISO 186,
    wherein the samples do not include any crease line, fold or edge,
    wherein a direction in which the sheetlike composite has a bending resistance is a direction of a straight line connecting two attack points of the two-point bending test used to determine this bending resistance.
11. A closed container, comprising the sheetlike composite according to claim 1.
12. A closed container, surrounding an interior;
    wherein the closed container comprises a sheetlike composite;
    wherein the sheetlike composite comprises as a layer sequence in a direction from an exterior of the closed container to the interior
    a) an outer polymer layer,
    b) a colour application,
    c) a carrier layer, and
    d) a barrier layer;
    wherein the closed container has at least one longitudinal edge;
    wherein the at least one longitudinal edge is oriented in a first direction;
    wherein the sheetlike composite has a first bending resistance in the first direction;
    wherein a further direction is perpendicular to the first direction;
    wherein the sheetlike composite has a further bending resistance in the further direction;
    wherein the first bending resistance is less than the further bending resistance,
    wherein each bending resistance is determined according to a two-point bending test described in the standard ISO 2493-2:2011,
    wherein, for the two-point bending test, samples of widths of 38 mm and clamping lengths of 50 mm are prepared in accordance with ISO 186,
    wherein the samples do not include any crease line, fold or edge, wherein a direction in which the sheetlike composite has a bending resistance is a direction of a straight line connecting two attack points of the two-point bending test used to determine this bending resistance.

\* \* \* \* \*